Figure 2:
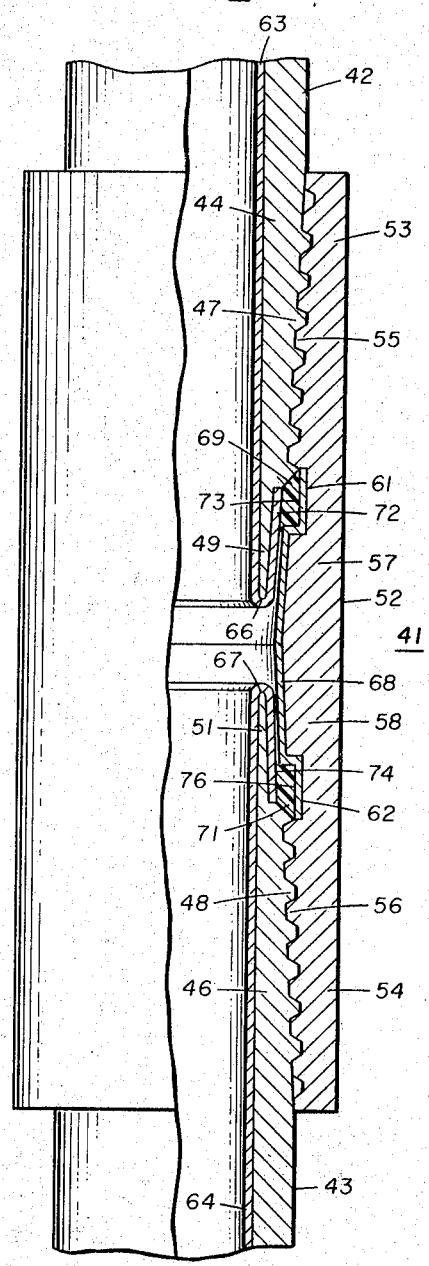

March 7, 1967     F. E. BLOUNT ET AL     3,307,860
JOINT FOR LINER-CARRYING WELL PIPE
Filed Jan. 15, 1965

FLOYD E. BLOUNT
ALVIN V. METLER
INVENTORS

BY *Emil J. Bednar*

ATTORNEY

United States Patent Office 3,307,860
Patented Mar. 7, 1967

3,307,860
JOINT FOR LINER-CARRYING WELL PIPE
Floyd E. Blount and Alvin V. Metler, Dallas, Tex., assignors to Mobil Oil Corporation, a corporation of New York
Filed Jan. 15, 1965, Ser. No. 425,760
1 Claim. (Cl. 285—55)

This invention is directed to a joint for interconnecting well pipe carrying a thin-walled liner of a corrosion resistant metal wherein a pressure-actuated seal is employed in such joint.

Well pipes, usually of ferrous metals, are employed in connection with the drilling of wells into the earth and the production of fluids from such wells. Generally, the well pipes have lengths convenient for handling and carry threaded joints at their ends so that the lengths of well pipe can be readily interconnected. The threaded joint may also provide a seal by metal-to-metal contact over coacting metal sealing surfaces. Preferably, the seal to fluids is provided adjacent one end of the threaded engagement, usually the external end. However, it is preferred that a seal be placed at the internal end of the threaded engagement so that fluids contained within the well pipe, which fluids may be corrosive, will not contact the threads between the joint members. For this purpose, in some joints, a deformable seal ring, carried by one member in the joint, is compressed when the well pipes are interconnected to provide a seal to fluids. Examples of such sealed joint are to be found in U.S. Patents 3,047,316 and 3,054,628. Usually, the joints employed for conventional well pipe interconnections are "roughneck proof" by design of their threads and engaging surfaces. It may be usually assumed that such joints are made up within a two-thread variation under the usual conditions found in the oil fields. Thus, the use of seal rings providing seals to fluids in such joints must operate satisfactorily under these field conditions. When the deformable seals contact opposing surfaces which are substantially parallel to the axis of the well pipe, such seals are substantially free of leakage due to a variation in the make-up interfitting of the threaded joint members. Additionally, the joints should be compatible with other well equipment such as wellheads, packers, and tools.

The well pipe within a well many times is subjected to great fluid pressures and damaging environments. This is especially true of well tubing in many recent deep wells which carry production fluids at pressures of even over 14,000 p.s.i. Thus, the joints between well tubings in a string must be able to contain such pressures. A leak of any magnitude at such pressures will soon cut through a joint and cause loss of production fluids into the annulus in the well about the well tubing. Strings of well tubing are also subject in many fields to severe corrosion and embrittlement environments. These environments are usually most severe in the upper portion of the well where temperatures are lower and where liquid water amounts and tensile stresses are at a maximum.

It has been proposed to place a thin-walled liner of a corrosion resistant metal within the well pipe, particularly well tubing, to prevent corrosion damage to the ferrous metals of which they are usually made. The use of a thin-walled liner of such metal would adequately protect the well pipe. However, such liner must be made relatively thin to be economical in its use because of the great cost of such metal relative to ferrous metals commonly employed for well pipe. For this reason, it has been proposed in one structure in the past to provide a liner of a corrosion resistant metal expanded within the ferrous well pipe with a compression-type seal ring employed at each joint for making a proper fluid-seal between the liners in adjacent interthreaded well pipes. This type of joint must be carefully threaded together to within certain torque limits in order to secure the desired sealing pressure between the members of the threaded joint. Additionally, as with any compression-type sealing ring usage, great care must be employed for securing such joint into fluid tightness. Such joints in the past have not been considered very desirable because of the difficulties and expenses involved in obtaining the desired fluid-seal.

In accordance with this invention, one of the preferred metals for fabricating the thin-walled liner for well pipes is titanium and its alloys. More particularly, for these metals to be used economically at the present time, a liner constructed of them has to have a sidewall thickness of about 0.060 inch and preferably about 0.020 inch. Although a liner of these metals and other similar corrosion resistant metals is readily obtained, there exists a serious problem to connect such liners to the well pipes. For example, titanium and its alloys cannot be conventionally welded to ferrous well pipes. They can be joined by certain brazing methods, but these methods greatly increase the fabrication cost.

The present invention is directed to the use of liners of corrosion resistant metals which are disposed within well pipe and which employ joints for interconnecting such well pipe wherein is employed a deformable sealing ring. These joints and rings may be of conventional construction. The liners are so arranged at the pin and box members of each joint that when they are interconnected, the deformable ring provides for a fluid-seal between the liners in one joint member and another, and also provides for securing the liners to each of their respective joint members. Additionally, the deformable ring is so arranged as to be pressure actuated and so as not to be subject to leakage when the normal interthreading variation for assemblying well pipes is encountered.

Figure 1:
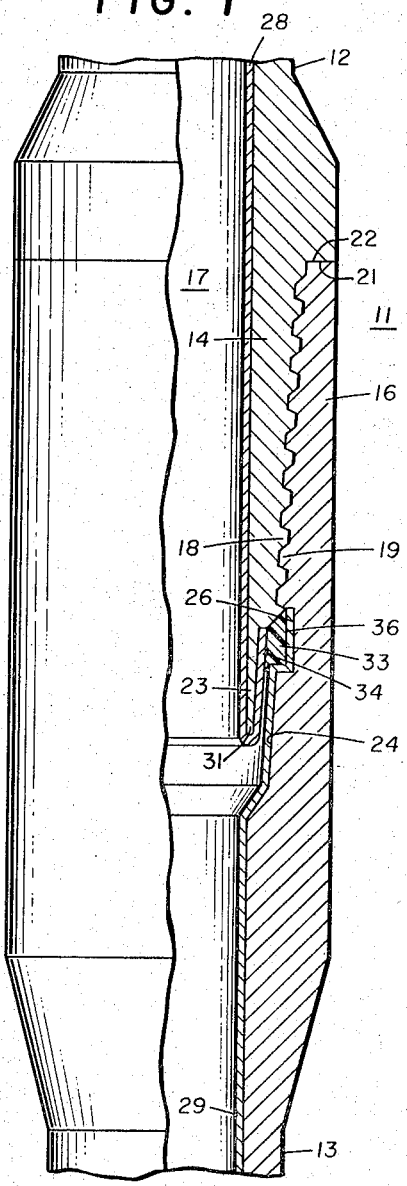

It is an object of this invention to provide an interconnecting joint for liner-carriyng well pipe. Another object is to provide a joint, compatible with other well equipment, which employs a deformable sealing ring for interconnecting well pipe carrying a thin-walled liner of corrosion resistant metal. It is another object to provide lined well pipe, and connecting threaded joints of conventional design, for ready employment in accordance with this invention. Another object is to employ with ferrous well pipe, a thin-walled liner of titanium or its alloys without using welding, brazing, or separate compression rings for providing a desired fluid-seal between the liners at the joint members. Another object is to provide well pipe carrying a thin-walled liner of a corrosion resistant metal which employs a deformable sealing ring as the seal against fluid pressure and which joint does not require a precise interthreading connection for proper assembly. Another object is to provide well pipe, and a joint for interconnecting such well pipe, of conventional construction with a thin-walled titanium liner without appreciable machining or fabrication expenses. These and further objects will be apparent when read in consideration with the following detailed description, the appended claims, and the attached drawings, wherein:

FIGURE 1 is a view, partially in elevation and partially in longitudinal cross section, in a preferred embodiment of this invention of an external upset liner-carrying well pipe and a joint of interconnected pin and box members; and FIGURE 2 is a view, partially in elevation and partially in longitudinal cross section, of yet another embodiment of this invention wherein liner-carrying well pipe with pin members is interconnected with a coupling carrying box members.

For description of a preferred embodiment of this inention, refer now to FIGURE 1 where there is shown joint, generally designated by the numeral 11, employed or interconnecting aligned well pipes 12 and 13. The well pipes 12 and 13 carry pin and box members for threaded interconnection and these structures may be of conventional design. The well pipe 12 carries an upset pin member 14 while the well pipe 13 carries an upset box member 16. As can be clearly seen, the flow passageway 17 within the joint 11 is maintained uniformly open with the remainder of the well pipes 12 and 13.

The pin member 14 has threads 18 which interfit with threads 19 carried on the box member 16. Any suitable thread design may be used. The threads 18 and 19 in the joint 11 are exemplified as a tapered modified buttress style. The pin member 14 and the box member 16 carry butting shoulders 21 and 22, respectively, providing a positive stop to limit the amount of coaxial interfitting.

The pin member 14, at the beginning of its threads 18, is provided with a tapered reduced diameter portion 23. The box member 16, at the inner end of its threads 19 and extending rearwardly therefrom, carries a tapered increased diameter portion 24. The portions 23 and 24 reside opposite one another at least in part when the pin and box members are threadedly interconnected.

The box member 16 adjacent the inner end of its threads 19 and in the increased diameter portion 24 is provided with a groove 26 of a depth at least the height of the adjacent threads and a width at least equal to the pitch of these threads. Expressed alternatively, the groove 26 has a width at least equal to the distance between the threads next to the groove 26.

As can be seen in FIGURE 1, the portions 23 and 24 of the pin and box members 14 and 16, respectively, are spaced a small distance from one another. This spacing will be defined in more detail hereinafter. The portions 23 and 24 desirably have opposite sidewall surfaces which are relatively smooth. The joint 11 is so dimensioned that upon interconnection of the pin and box members 14 and 16, respectively, the threads 18 usually will extend a short distance into the groove 26. This intrusion of the threads 18 into the groove 26 provides a desired amount of precompression of a deformable sealing ring to be disposed therein, and which ring will be described fully hereinafter.

The well pipes 12 and 13 carry liners 28 and 29, respectively, of corrosion resistant material. Although various materials may be employed such as plastics and metals, the latter are preferred. The thin-walled liners 28 and 29 are best made of a corrosion resistant metal which, for example, may be K–Monel, 410 stainless steel, and as one advantage of this invention, titanium and its alloys, such as Ti–6Al–4V. Preferably, these liners are made of titanium or its alloys and may have a thickness of about .020 and .060 inch for economic reasons as previously mentioned. The corrosion resistant material employed to fabricate the liners should be relatively ductile and have sufficient hardness so as not to be readily injured by wire-line operations and the like after it is installed within a well.

The thin-walled liners 28 and 29 are disposed in sidewall engaging relationship with each of the well pipes 12 and 13, respectively, and their associated pin and box members 14 and 16, respectively. By the term "sidewall engaging relationship" as the term is used herein, it is meant that the liners are in sufficient engagement with the well pipes 12 and 13 so that subsequent radial expansion of the liners responsive to applied fluid pressure during use causes no longitudinal contraction of a magnitude sufficient to sever the liners themselves or to separate the liners at their ends from their connections to the well pipes. For such arrangement, the liners 28 and 29 are positioned within the respective well pipes 12 and 13. Thereafter, the liners are expanded by any suitable means into sidewall engagement with the inner surfaces of these well pipes. For example, a forcing mandrel may be passed through the liners expanding them radially outwardly into suitable sidewall engagement with the well pipes 12 and 13.

Whenever the liners are titanium and its alloys, they cannot be shrink-fitted within the respective well pipes. The reason for this result is that titanium will expand and contract more in response to pressure changes than ferrous or other similar metals. Thus, the liners cannot be expanded into such intimate engagement with the respective well pipes that the two can be considered mechanically as one.

The liner 28 is allowed to extend a short distance beyond the end of the pin member 14. Thereafter, the liner 28 is returned, by any suitable forming means, about the terminus 31 of the pin member 14 to enclose the tapered reduced diameter portion 23 projecting therefrom. A spinning lathe, mandrels and like tools may be used for this operation. When the liner 28 is of titanium or similar metals, it expands more readily than the well pipe 12 to securely encirclingly engage the portion 23.

The liner 29 disposed in the well pipe 13 extends into the box member 16 axially outwardly to the outer end of the groove 26 residing adjacent the inner end of its threads 19. The liner 29 may be placed into the desired sidewall engaging relationship in the portion 24 and groove 26 of the pin member 16 by any suitable means. For example, a spinning lathe may be employed to urge outwardly the liner 29 against the presented inner surfaces of the box member 16. With certain of the corrosion resistant metals, it may be desirable to anneal the liners 28 and 29 as they are distended into engagement with the respective pin and box members 14 and 16.

It will be apparent, when viewing joint 11 in FIGURE 1, that the liner 28 is held substantially rigidly at the pin member 14 by the returned portion enclosing the projecting portion 23. The liner 29 is held intimately at the box member 16 by its engagement with the tapering inner surfaces of the increased diameter portion 24, especially within the groove 26. Thus, the liners 28 and 29 are securely locked within the well pipes 12 and 13. Where a well pipe carries pin and box members on its ends, the liner is securely held in place so that the well pipe may be handled in a conventional manner without any loose fitting parts. For all practical purposes, assuming the joint 11 and well pipe to be of conventional structure, the liner appears integral with these structures. Thus, the lined well pipe is fully compatible with the other pieces of well equipment normally employed in the field.

Disposed within the groove 26 is a deformable sealing ring 33. The sealing ring may be of any suitable material such as of the materials which are commonly used for such purposes in the joints of well pipe. Plastics or polymers are found to be well suited for this purpose. Preferably, the sealing ring 33 is made of polytetrafluoroethylene, a plastic material. The sealing ring 33 is dimensioned to substantially fill the groove 26 and has a thickness sufficient to engage the exterior surface 34 of the liner 28 returned about the portion 23 of the pin member 14. The sealing ring 33 on its exterior surface of course engages the interior surface 36 of the liner 29 residing within groove 26. When the pin and box members 14 and 16, respectively, are interfitted, the abutting shoulders 21 and 22 and the threads 18 and 19 cooperate to form a downstream fluid-seal. As mentioned, the thread 18 on the pin member 14 enters the groove 26 sufficiently to compress the sealing ring 33 into fluid-tight sealing engagement with the surfaces 33 and 34 of the liners 28 and 29, respectively. Preferably, the sealing ring 33 is a pressure-actuated seal since the sides and downstream end of the ring 33 are rigidly supported. For this purpose, the sealing ring 33 is deformable under the pressures to be carried within the well pipes 12 and 13, respectively. Thus, once an initial fluid-seal is obtained between the sealing ring 33 and surfaces 34 and 36, increased pressure will increase the tightness of the fluid-seal.

From the foregoing it will be apparent that there has been provided a joint for interconnecting liner-carrying well pipe wherein conventional tubular and threaded members found in everyday oil field practices may be employed. More particularly, the threaded members and sealing ring of FIGURE 1 are shown in U.S. Patent 3,047,316, and commercially used in oil fields. The liners 28 and 29 may be readily placed into the desired sidewall engaging relationship within these well pipes 12 and 13 without any substantial modification of the joints, or involving special machining, or employing welding, brazing, and other means of direct mechanical interconnection. Where the liners 28 and 29 are of the stated thicknesses, conventional joints usually may be employed. However, if desired, the inner surfaces receiving the liner in the pin and box members may be slightly relieved to accommodate the thickness of the liner.

The portions 23 and 24 of the pin and box members 14 and 16, respectively, are spaced apart a distance sufficient that the liners 28 and 29 do not engage with an injurious force when these members are interfitted. Any clearance between the liners 28 and 29 when the pin and box members are interfitted is generally sufficient. However, these liners may slightly engage providing they do not do so with sufficient force to effect galling or other destructive injury to them.

Turning now to FIGURE 2 of the drawings, a second embodiment of the present invention will be described which is particularly adapted toward the use of well pipe which carries pin or box members on its ends, and which employs a coupling carrying other of the pin or box members at its ends for interconnecting the well pipe. More particularly in example, there is shown well pipes 42 and 43 carrying at their ends pin members 44 and 46 which may be of conventional design. Each of the pin members 44 and 46 carries threads 47 and 48, respectively, of any suitable design. The pin member 44 carries at its end a tapered reduced diameter portion 49 projecting therefrom at the beginning of its threads 47. The pin member 46 carries at its end a tapered reduced diameter portion 51 projecting therefrom at the beginning of its threads 48. The threads 47 and 48 may be of any conventional form suitable for interconnecting well pipe. Various threads are known for this purpose and, as one example, the interfitting threads in FIGURE 2 are of the modified tapered buttress style.

A tubular coupling 52 is employed for interconnecting the well pipes 42 and 43 in alignment. The coupling 52 may be of conventional or other form suitable for interfitting with the pin members 44 and 46, respectively. More particularly in example, the coupling 52 is provided with box members 53 and 54. The box member 53 carries threads 55 interfitting with the threads 47. The box member 54 carries threads 56 interfitting with the threads 48. Thus, the well pipes 42 and 43 may be threadedly interconnected with the coupling 52 in a conventional manner. The coupling 52 carries increased diameter portions 57 and 58 beginning at the inner end of its threads 55 and 56, respectively. These portions 57 and 58 taper inwardly as they extend rearwardly toward the center of the coupling 52. The portion 57 resides at least in part opposite the portion 49 of the pin member 44 when the pin and box members 44 and 53, respectively, are interfitted. The portion 58 resides opposite the portion 51 of the pin member 46 at least in part when the pin and box members 44 and 54, respectively, are interfitted.

The coupling 52 adjacent each inner end of its threads 55 and 56 in the increased diameter portions 57 and 58 is provided with grooves 61 and 62, respectively. Each of the grooves 61 and 62 is of a depth at least the height of the adjacent threads 55 and 56, respectively, and has a width at least equal to the distance between adjacent threads 55 and 56 next to the groove 61 and 62, respectively. This distance may be more commonly termed the pitch of these threads. Preferably, the portions 49 and 51 on the pin members 44 and 46, respectively, and the portions 57 and 58 along with the grooves 61 and 62 on the box members 53 and 54, respectively, have a relatively smooth surface.

Thin-walled liners 63 and 64, which may be of the same construction as liners 28 and 29 previously mentioned, are disposed similarly in sidewall engaging relationship within each of the well pipes 42 and 43. The liner 63 extends through the pin member 44 and is returned about its terminus 66 to encirclingly enclose the portion 49 which projects therefrom. The liner 64 extends through the pin member 46 and is returned about its terminus 67 to enclose the portion 51 projecting therefrom. Any suitable means for returning the liners 63 and 64 about the tapered portions 49 and 51 may be employed. For example, a spinning lathe may be used for this purpose. The definition of the terms regarding the liners and their positioning is the same as in the previously described embodiment.

A liner 68, which may be of the same construction as liners 63 and 64, is disposed in sidewall engaging relationship against the inner surfaces of the coupling 52. The liner 68 extends axially outwardly from the center of the coupling 52 to the outer ends of each of the grooves 61 and 62 adjacent the threads 55 and 56, respectively. The liner 68 may be distended into the desired sidewall engaging relationship within the coupling 52 by any suitable means. For example, a spinning lathe may be employed to urge outwardly the liner 68 into engagement with the inner surfaces of the coupling 52 in the same manner as has been described with regard to the liner 29 within a box member 16 of the joint 11.

Deformable sealing rings 69 and 71 are carried within grooves 61 and 62, respectively. These rings may be of the same nature as the sealing ring 33 previously described. The ring 69 has a thickness sufficient to engage the exterior surface 72 of the liner 63 returned about the portion 49 and the inner surface 73 of the liner 58 received within the groove 61. Similarly, the ring 71 engages the exterior surface 74 of the liner 64 returned about the portion 51 and the inner surface 76 of the liner 68 received within groove 62. Thus, the sealing rings 69 and 71, respectively, provide fluid-seals between the liners 63 and 64, and the liner 68 to prevent fluid leakage at the joint 41. As previously mentioned, the seals 69 and 71 for best operation are pressure actuated by the pressure of the fluid carried within the well pipes 42 and 43.

As in the embodiment described of FIGURE 1, the threads 47 preferably enter the groove 61 a slight distance so as to precompress the sealing ring 69. Similarly, the threads 48 enter the groove 62 a slight distance to precompress the sealing ring 71. This provides the desired initial sealing engagement for the sealing rings when of a deformable material and thus these sealing rings will function responsive to fluid pressures within the well pipes 42 and 43 as pressure-actuated seals. This is of great advantage in that compression-type or mechanically energized seals to withstand the pressure within these well pipes are not required.

Preferably, the tapered portions 49 and 57, and 51 and 58, are spaced apart a distance sufficient that the liners 63 and 64, and the liner 68, which liners are carried on the respective pin and box members, do not engage with an injurious force when these members are interfitted. Preferably, these liners are spaced a slight distance from one another when the pin and box members are interfitted. However, these liners may contact one another providing that galling or other distinctive injury does not occur to them.

Where the liners 63 and 64 are of the thickness previously indicated desirable, conventional joint members ay be employed. However, the inner surfaces upon which these liners are received may be relieved to accommodate the liners when the joint 41 is assembled or or other reasons.

It will be apparent that on assembly the joints 11 and 1 of the embodiments shown in FIGURES 1 and 2, the sealing rings carried between the pin and box members not only provide a fluid-seal, but also serve to additionally lock the liners to the respective pin and box members. Thus, once the joint is assembled, fluid pressure within the well pipe will push the sealing rings back against their downstream supports forming a pressure-actuated seal with a simultaneous mechanical locking of the liners to the respective pin and box members. Thus, all of the advantages of a liner-carrying well pipe are obtained with only the liner being made of corrosion resistant metal which preferably is titanium or its alloys.

From the foregoing, it will be apparent that there has been provided a joint interconnecting well pipe carrying a thin-walled liner of a corrosion resistant metal especially well suited for satisfying all of the stated objects of this invention. Various modifications and alterations in the described structures will be apparent to those skilled in the art from the foregoing description which do not depart from the spirit of the invention. For this reason, these changes are desired to be included within the scope of the appended claims. The appended claims recite the only limitations of the present invention and the descriptive matter which is employed for setting forth the present embodiments is to be interpreted as illustrative and not limitative.

What is claimed is:

A joint interconnecting well pipe carrying a thin-walled liner of titanium comprising:

(a) well pipe having an axial flow passage for carrying fluids at an elevated pressure and integrally carrying at its ends tubular pin and box members, said pin member of one well pipe received axially forwardly into said box member carried on another well pipe, said pin and box members having interfitting threads for mechanically interconnecting adjacent well pipe carrying said members and means through which sealing pressure is exerted between said pin and box members, (b) a tapered reduced diameter portion projecting from said pin member at the beginning of its threads, (c) said box member provided a tapered increased diameter portion at the inner ends of its threads and extending rearwardly therefrom, and said tapered portions of said pin and box members residing opposite one another at least in part when said members are interfitted, (d) said box member adjacent the inner ends of its threads and in said increased diameter portion having a groove of a depth at least the height of said threads and a width at least equal to the distance between adjacent threads next to said groove, said groove residing opposite said tapered reduced diameter portion projecting from said pin member when said pin and box members are interfitted, (e) a thin-walled liner of titanium disposed within each well pipe and extending between said pin and box members carried thereon, said liner outwardly distended into a sidewall engaging relationship against the inner surfaces of said well pipe and said pin and box members so that upon fluids, at elevated pressure, entering said flow passage said liner undergoes insufficient radial expansion that longitudinal contraction causes rupturing of said liner, said liner in said box member conforming in sidewall engaging relationship to the interior sidewall and bottom surfaces of said groove, and said liner extending in said box member outwardly to the outer end of said groove adjacent said threads, and said liner in said pin member returning in sidewall engaging relationship about the terminus of said pin member to enclose said tapered reduced diameter portion projecting therefrom, (f) said tapered reduced and increased diameter portions spaced apart a distance sufficient that said thin-walled liner carried on said pin and box members does not engage with an injurious force when said members are interfitted, and (g) a deformable sealing ring of polymeric plastic material substantially filling said groove and having a thickness sufficient to engage the exterior sidewall surface of said liner returned about said tapered reduced diameter portion of said pin member and to engage the interior sidewall and bottom surfaces of said groove in said box member, and said ring being compressed axially in said groove by said threads of said pin member when said pin and box members are interfitted and by such engagement producing a seal against fluid leakage between said sealing ring and the engaged sidewall surfaces of said liner within each said pin and box member, and when said pin and box members are interfitted, said ring providing a mechanical lock to anchor said liner about the terminus of said pin member and within said groove in said box member that elongation of said well pipe to its yield point will not pull said liner from its operative position in said pin and box members.

References Cited by the Examiner

UNITED STATES PATENTS

| | | | |
|---|---|---|---|
| 1,590,357 | 6/1926 | Feisthamel | 285—333 X |
| 2,132,574 | 10/1938 | Moise | 285—55 |
| 2,201,862 | 5/1940 | Heisterkamp | 285—55 |
| 2,532,632 | 12/1950 | MacArthur | 285—55 |
| 2,919,936 | 1/1960 | Hurley | 285—55 |
| 2,938,562 | 5/1960 | Watts | 29—234 |
| 3,047,316 | 7/1962 | Wehring | 285—349 |
| 3,100,656 | 8/1963 | MacArthur | 285—55 |

FOREIGN PATENTS

| | | |
|---|---|---|
| 649,610 | 10/1962 | Canada. |
| 883,048 | 6/1943 | France. |

CARL W. TOMLIN, *Primary Examiner.*

R. GIANGIORGI, *Assistant Examiner.*